United States Patent
Kitazoe et al.

(10) Patent No.: US 9,480,067 B2
(45) Date of Patent: Oct. 25, 2016

(54) TECHNIQUES FOR ALLOCATING USER EQUIPMENT PROCESSING CAPABILITY AMONG MULTIPLE ACCESS NODES

(71) Applicant: QUALCOMM Incorporated, San Diego, CA (US)

(72) Inventors: Masato Kitazoe, Tokyo (JP); Gavin Bernard Horn, La Jolla, CA (US); Jelena Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 144 days.

(21) Appl. No.: 14/444,691

(22) Filed: Jul. 28, 2014

(65) Prior Publication Data
US 2015/0043479 A1   Feb. 12, 2015

Related U.S. Application Data

(60) Provisional application No. 61/863,540, filed on Aug. 8, 2013.

(51) Int. Cl.
*H04W 72/04* (2009.01)
*H04W 72/08* (2009.01)
(Continued)

(52) U.S. Cl.
CPC ......... *H04W 72/048* (2013.01); *H04W 72/044* (2013.01); *H04W 72/0446* (2013.01);
(Continued)

(58) Field of Classification Search
CPC ......... H04W 72/044; H04W 72/0486; H04W 72/0446; H04W 84/045; H04W 72/08; H04W 88/06; H04W 72/045; H04W 74/04; H04W 24/00; H04W 36/00; H04W 48/16; H04W 76/046; H04W 76/025; H04W 36/0072; H04W 72/042; H04W 72/1268; H04W 72/1263; H04L 5/0032
See application file for complete search history.

(56) References Cited

U.S. PATENT DOCUMENTS

| | | | |
|---|---|---|---|
| 9,125,112 B2 * | 9/2015 | Gao | H04W 36/22 |
| 2005/0060319 A1 | 3/2005 | Douglas et al. | |

(Continued)

OTHER PUBLICATIONS

CMCC: "RAN level QoS and UE Radio Capability Parameters Guarantee for dual-connectivity", 3GPP Draft; R2-140128 RAN Level QOS and UE Radio Capability Parameters Guarantee for Dual-Connectivity, 3rd Generation Partnership Project (3GPP), Mobile Competence Centre ; 650, Route Des Lucioles ; vol. RAN WG2, no. Prague, Czech Republic; 20140210-20140214 Jan. 27, 2014, XP050753821, pp. 1-4, Retrieved from the Internet:URL:http://www.3gpp.org/ftp/tsg_ran/WG2_RL2/TSGR2_85/Docs/.
International Search Report and Written Opinion—PCT/US2014/048633—ISA/EPO—Dec. 18, 2014, (16 pages).
(Continued)

*Primary Examiner* — Yee Lam
(74) *Attorney, Agent, or Firm* — Arent Fox LLP

(57) ABSTRACT

Certain aspects of the present disclosure relate to allocating user equipment (UE) processing capability among multiple access nodes. In an aspect, processing capability of a UE may be determined. When the UE is in communication with at least a first access node and a second access node, a first allocation of the UE processing capability for the first access node or a second allocation of the UE processing capability for the second access node may be determined. Resources may be assigned for the UE based at least in part on the first allocation or the second allocation. In an aspect, the first access node and the second access node may negotiate to determine the first allocation or the second allocation. In an aspect, the first allocation or the second allocation may be determined based on a previously-configured rule associated with a category of the UE.

30 Claims, 9 Drawing Sheets

(51) Int. Cl.
*H04W 88/06* (2009.01)
*H04W 84/04* (2009.01)

(52) U.S. Cl.
CPC ..... *H04W 72/0426* (2013.01); *H04W 72/0486* (2013.01); *H04W 72/08* (2013.01); *H04W 84/045* (2013.01); *H04W 88/06* (2013.01)

(56) References Cited

U.S. PATENT DOCUMENTS

| | | | |
|---|---|---|---|
| 2009/0149162 A1 | 6/2009 | Tenny | |
| 2012/0002614 A1 | 1/2012 | Ekici et al. | |
| 2013/0039232 A1 | 2/2013 | Kim et al. | |
| 2013/0194947 A1 | 8/2013 | Ehsan et al. | |
| 2013/0252602 A1 | 9/2013 | Meshkati et al. | |
| 2014/0056243 A1* | 2/2014 | Pelletier | H04W 74/04 370/329 |
| 2014/0198734 A1* | 7/2014 | Yamada | H04W 76/00 370/329 |
| 2014/0269352 A1* | 9/2014 | Sun | H04W 72/1284 370/250 |
| 2014/0286243 A1* | 9/2014 | Yamada | H04W 76/025 370/329 |
| 2014/0355538 A1* | 12/2014 | Chen | H04W 72/048 370/329 |
| 2015/0208303 A1* | 7/2015 | Jung | H04W 8/08 455/436 |
| 2016/0081076 A1* | 3/2016 | Zhang | H04B 7/026 370/336 |

OTHER PUBLICATIONS

QUALCOMM Incorporated: "Handling of Layer 1 processing capability", 3GPP Draft; R2-134008 Dual Connectivity Layer1 Process ING, 3rd Generation Partnership Project (3GPP), Mobile Competence Centre ; 650, Route Des Lucioles ; F-06921 Sophia-Antipolis Cedex ; France vol. RAN WG2, no. San Francisco, United States; 20131111-20131115 Nov. 2, 2013, XP050753320, pp. 1-2, Retrieved from the Internet: URL: http://www.3gpp.org/ftp/tsg_ran/WG2_RL2/TSGR2_84/Docs/.

Samsung: "L1 UE Capability Handling for Dual Connectivity", 3GPP Draft; R2-140701 L1 Capability Handling for DC, 3rd Generation Partnership Project (3GPP), Mobile Competence Centre ; 650, Route Des Lucioles ; F-06921 Sophia-Antipolis Cedex ; France Jan. 31, 2014, XP050754239, pp. 1-4, Retrieved from the Internet: URL:http://www.3gpp.org/ftp/tsg_ran/WG2_RL2/TSGR2_85/Docs/.

Sharp: "PCell vs. SCell with PUCCH for inter-eNB CA", 3GPP Draft; R2-132052 Small Cell CA, 3rd Generation Partnership Project (3GPP), Mobile Competence Centre ; 650, Route Des Lucioles ; F-06921 Sophia-Antipolis Cedex; France vol. RAN WG2, no. Fukuoka, Japan; 20130520-20130524 May 11, 2013, XP050700141, pp. 1-6, Retrieved from the Internet: URL: http://www.3gpp.org/ftp/tsg_ran/WG2_RL2/TSGR2_82/Docs/.

ZTE: "Discussion on coordination between MeNB and SeNB about UE capability", 3GPP Draft; R2-140118 Discussion on Coordination Between MENB and SENB About UE Capability, 3rd Generation Partnership Project (3GPP), Mobile Competence Centre ; 650, Routes des Lucioles ; F-06921 SOPH vol. RAN WG2, no. Prague, Czech; 20140110-20140114, Jan. 29, 2014, XP050753867, pp. 1-6, Retrieved from the Internet: URL: http://www.3gpp.org/ftp/tsg_ran/WG2_RL2/TSGR2_85/Docs/.

* cited by examiner

TECHNIQUES FOR ALLOCATING USER EQUIPMENT PROCESSING CAPABILITY AMONG MULTIPLE ACCESS NODES

CROSS REFERENCE TO RELATED APPLICATION

The present Application for Patent claims priority to Provisional Application No. 61/863,540 entitled "Techniques for Allocating User Equipment Processing Capability Among Multiple Access Nodes" filed Aug. 8, 2013, and assigned to the assignee hereof and hereby expressly incorporated by reference herein.

BACKGROUND OF THE DISCLOSURE

Aspects of the present disclosure relate generally to wireless communications, and more particularly, to techniques for allocating user equipment processing capability between multiple access nodes.

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of evolved Node Bs (also referred to as eNodeBs or eNBs) that can support communication for a number of user equipments (UEs). A UE may communicate with an eNodeB via the downlink and uplink. The downlink (or forward link) refers to the communication link from the eNodeB to the UE, and the uplink (or reverse link) refers to the communication link from the UE to the eNodeB.

A UE may, simultaneously, be separately connected to two (or more) access nodes. The access nodes may be eNodeBs and/or wireless local area network (WLAN or Wi-Fi) access points. Operating according to this type of simultaneous, separate connection may be referred to as "dual connectivity" operation or as a "dual connectivity mode" of the UE. Because the UE is connected to two separate access nodes, two separate schedulers (e.g., one scheduler per access node) are allocating radio resources to the single UE. Despite the dual connectivity, the UE only has a certain amount of processing capability. If the access nodes are not aware that the UE is also in communication with another access node, the two (or more) access nodes may perform scheduling that, together, requires processing capabilities that exceed that available at the UE. In view of the foregoing, it can be understood that there may be significant problems and shortcomings associated with current technology when a UE is in dual connectivity mode.

As such, improvements in allocating UE processing capability between multiple access nodes are desired.

SUMMARY OF THE DISCLOSURE

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, a method of allocating user equipment processing capability is described. The method may include determining the user equipment processing capability. The method may include determining a first allocation of the user equipment processing capability for a first access node or a second allocation of the user equipment processing capability for a second access node when the user equipment is in communication with at least the first access node and the second access node. The method may include assigning resources for the user equipment based at least in part on the first allocation or the second allocation.

In an aspect, a non-transitory computer-readable medium for allocating user equipment processing capability stores computer-executable code. The code may cause at least one computer to determine the user equipment processing capability. The code may cause at least one computer to determine a first allocation of the user equipment processing capability for a first access node or a second allocation of the user equipment processing capability for a second access node when the user equipment is in communication with at least the first access node and the second access node. The code may cause at least one computer to assign resources for the user equipment based at least in part on the first allocation or the second allocation.

In an aspect, apparatus for allocating user equipment processing capability is described. The apparatus may include means for determining the user equipment processing capability. The apparatus may include means for determining a first allocation of the user equipment processing capability for a first access node or a second allocation of the user equipment processing capability for a second access node when the user equipment is in communication with at least the first access node and the second access node. The apparatus may include means for assigning resources for the user equipment based at least in part on the first allocation or the second allocation.

In an aspect, an apparatus for allocating user equipment processing capability is described. The apparatus may include at least one memory. The apparatus may include a scheduler, in communication with the at least one memory. The scheduler may be configured to determine the user equipment processing capability. The scheduler may be configured to determine a first allocation of the user equipment processing capability for a first access node or a second allocation of the user equipment processing capability for a second access node when the user equipment is in communication with at least the first access node and the second access node. The scheduler may be configured to assign resources for the user equipment based at least in part on the first allocation or the second allocation.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

In order to facilitate a fuller understanding of the present disclosure, reference is now made to the accompanying drawings, in which like elements are referenced, with like numerals. These drawings should not be construed, as limiting the present disclosure, but are intended to be illustrative only.

DETAILED DESCRIPTION

Figure 1:
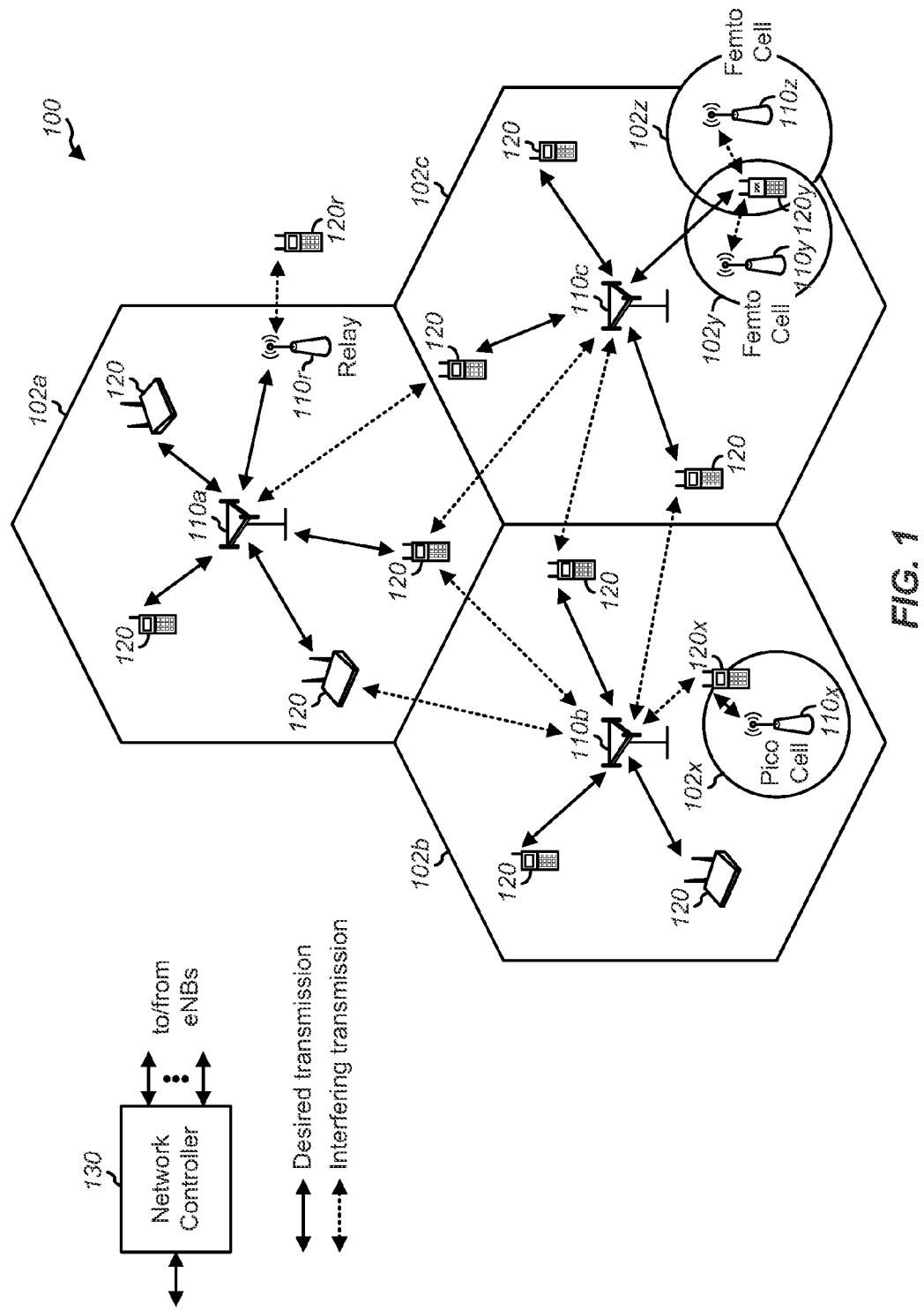
FIG. 1 is a block diagram conceptually illustrating an example of a telecommunications system having aspects for allocating user equipment processing capability among multiple access nodes.

The detailed description set forth below, in connection with the appended drawings, is intended as a description of various configurations and is not intended to represent the only configurations in which the concepts described, herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OF DMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers TS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

According to the present aspects, a user equipment (UE) may be simultaneously or concurrently connected to two (or more) access nodes, which may be referred to as operating according to "dual connectivity". For example, a UE may simultaneously be connected to two (or more) access nodes, such as, for example, eNodeBs and/or Wi-Fi access points. As such, total UE processing capability, which also may be referred to as a total UE processing resource, may be allocated between the two (or more) access nodes for scheduling the UE (e.g., assigning resources) at the access nodes and other purposes.

According to a first aspect, which may be referred to as an inter-access node coordination aspect, two (or more) access nodes (e.g., eNodeBs and/or Wi-Fi access points) that are simultaneously connected to a UE via the same radio access technology (RAT) or different RATs, and each other, may coordinate usage of the processing capability of the UE among themselves. The access nodes may be in direct communication via, for example, a backhaul or X2 connection, may communicate with one another using the UE as an intermediary, and/or may not capable of communicating with one another.

The access nodes may determine a split or division of UE processing capability based on one or a combination of factors, including but not limited to, for example, a required quality of service (QoS) of data flow of each access node, present or expected radio conditions (e.g., received, signal, Signal-plus-Interference-to-Noise Ratio (SINR), pathloss, and/or the like), a present or expected, load condition of each access node, present or expected access node capability (e.g., processing, throughput, and/or the like), backhaul performance (e.g., capacity, throughput, delay, and/or the like), and/or data buffer status. In an aspect, the coordination of the processing capability split may be performed once and remain static thereafter. In another aspect, the processing capability may be split dynamically and changed over time. The coordinated split may be arranged in a time multiplexed manner. In a non-limiting example, for instance, the split between access nodes may be on a subframe-by-subframe basis, or within a subframe. For example, but not limited hereto, a split within subframes may include a division such as a 60:40 ratio in certain subframes (e.g., subframes 0, 1, 2, 5, 9, for example, of FIG. 2) and a 30:70 ratio for the other subframes (e.g., subframes 3, 4, 6, 7, 8, for example, of FIG. 2) within every frame. The coordinated split may be signaled to the UE by one or all access nodes.

According to a second aspect, inter-access node coordination may not always be possible due to, for example, backhaul constraints, that the two (or more) access nodes are associated with different RATs, and/or that the two (or more) access nodes cannot communicate with one another. As such, UE processing capability may be allocated among the access nodes without any coordination between the access nodes. The allocation of UE processing capability as between the access nodes may be fixed, predefined, and/or previously-configured based on a UE category (referred to as UE-Category), which is related to a total processing capability for the UE. Once the UE category is known, each of the connected access nodes may retrieve category-related information for the UE, which may include the total processing capability for the UE and/or dual connectivity information, such as, for example, a specified capability allocation. In one example, the dual connectivity information may include a rule that indicates that UE processing capability is equally split between access nodes such that each access node is free to use up to half of the available UE processing capability. In another example, there may be an uneven split between access nodes (e.g., 40;60 ratio, 70;30 ratio, and/or the like).

Referring to FIG. 1, a telecommunications system 100 is configured to allocate user equipment processing capability among multiple access nodes according to the present aspects. The telecommunications system 100 may include a number of access nodes 110, user equipment (UEs) 120, and other network entities. In an aspect, the access nodes 110 may be evolved NodeBs (which also may be referred to as eNodeBs or eNBs) configured to provide UEs 120 with access to a cellular wireless communications network. In another aspect, access nodes 110 may be access points configured to provide UEs 120 with access to a wireless local area network (WLAN), for example, Wi-Fi.

In the aspect where access nodes 110 are eNodeBs, each eNodeB 110 may provide communication coverage for a particular geographic area. According to the 3rd Generation Partnership Project (3GPP) family of standards, the term "cell" can refer to a coverage area of an eNodeB 110 and/or an eNodeB subsystem serving the coverage area, depending on the context in which the term is used.

An eNodeB 110 may provide communication coverage for a macro cell, small cell, and/or other types of cell. As used herein, the term "small cell" may refer to an access point or to a corresponding coverage area of the access point, when the access point in this case has a relatively low transmit power or relatively small coverage as compared to, for example, the transmit power or coverage area of a macro network access point or macro cell. For instance, a macro cell may cover a relatively large geographic area, such as, but not limited to, several kilometers in radius. In contrast, a small cell may cover a relatively small geographic area, such as, but not limited to, a home, a building, or a floor of a building. As such, a small cell may include, but is not limited to, an apparatus such as a BS, an access point, a femto node, a femtocell, a pico node, a micro node, a Node B, eNB, home Node B (HNB) or home evolved Node B (HeNB). Therefore, the term "small cell," as used herein, refers to a relatively low transmit power and/or a relatively small coverage area cell as compared to a macro cell. In addition, the use of the term "pico cell" or "pico eNode B" may refer, generally, to any other type of small cell of the present disclosure.

In the example shown in FIG. 1, the eNodeBs 110a, 110b, and 110c may be macro eNodeBs for the macro cells 102a, 102b and 102c, respectively. The eNodeB 110x may be a pico eNodeB for a pico cell 102x. The eNodeBs 110y and 110z may be femto eNodeBs for the femto cells 102y and 102z, respectively. An eNodeB 110 may provide communication coverage for one or more (e.g., three) cells.

The telecommunications system 100 may include one or more relay stations 110r and 120r, that also may be referred to as a relay eNodeB, a relay, etc. The relay station 110r may be a station that receives a transmission of data and/or other information from an upstream station (e.g., an eNodeB 110 or a UE 120) and sends the received transmission of the data and/or other information to a downstream station (e.g., a UE 120 or an eNodeB 110). The relay station 120r may be a UE that relays transmissions for other UEs (not shown). In the example shown in FIG. 1, the relay station 110r may communicate with the eNodeB 110a and the UE 120r in order to facilitate communication between the eNodeB 110a and the UE 120r.

The telecommunications system 100 may be a heterogeneous network that includes eNodeBs 110 of different types, e.g., macro eNodeBs 110a, 110b, and 110c, pico eNodeB 110x, femto eNodeBs 110y and 110z, relay 110r and/or the like. These different types of eNodeBs 110 may have different transmit power levels, different coverage areas, and different impact on interference in the telecommunications system 100. For example, macro eNodeBs 110a, 110b, and/or 110c may have a high transmit power level (e.g., 20 Watts) whereas pico eNodeB 110x, femto eNodeBs 110y and 110z and/or relay 110r may have a lower transmit power level (e.g., 1 Watt).

The telecommunications system 100 may support synchronous or asynchronous operation. For synchronous operation, the eNodeBs 110 may have similar frame timing, and transmissions from different eNodeBs 110 may be approximately aligned in time. For asynchronous operation, the eNodeBs 110 may have different frame timing, and transmissions from different eNodeBs 110 may not be aligned, in time. The techniques described herein may be used for both synchronous and asynchronous operation.

A network controller 130 may be coupled to a set of eNodeBs 110 and provide coordination and control for the eNodeBs 110. The network controller 130 may communicate with the eNodeBs 110 via a backhaul (not shown). The eNodeBs 110 may also communicate with one another, e.g., directly or indirectly via wireless or wire line backhaul (e.g., an X2 interface) (not shown). In an aspect where telecommunications system 100 includes eNodeBs and one or more Wi-Fi access points, these two types of access nodes may, or may not, be connected to one another via the backhaul. However, in the case where the eNodeBs and Wi-Fi access points are not connected via the backhaul, the eNodeBs and the Wi-Fi access points may communicate with one another through an intermediary such as, for example, one of UEs 120.

The UEs 120 may be dispersed throughout the telecommunications system 100 and each UE 120 may be stationary or mobile. UEs 120 also may be referred to as terminals, mobile stations, subscriber units, stations, etc. In an example, each of UEs 120 may be a cellular phone, a smartphone, a personal digital assistant (PDA), a wireless modem, a wireless communication device, a handheld device, a laptop computer, a cordless phone, a wireless local loop (WLL) station, a tablet, a netbook, a smart book, and/or the like. The UEs 120 may be able to communicate with macro eNodeBs 110a, 110b, and 110c, pico eNodeB 110x, femto eNodeBs 110y and 110z, relays 110r, and/or any other network entity. For example, in FIG. 1, a solid line with double arrows may indicate desired transmissions between a particular UE 120 and its serving eNodeB 110, which is an eNodeB 110 designated to serve the particular UE 120 on the downlink and/or uplink. A dashed line with double arrows may indicate interfering transmissions between a particular UE 120 and an eNodeB 110 (e.g., a non-serving eNodeB).

LTE telecommunication networks may utilize orthogonal frequency division multiplexing (OFDM) on the downlink and single-carrier frequency division multiplexing (SC-FDM) on the uplink. OFDM and SC-FDM may partition the system bandwidth into multiple (K) orthogonal subcarriers, which are also commonly referred to as tones, bins, etc. Each subcarrier may be modulated with data. In general, modulation symbols may be sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz). Consequently, the nominal Fast Fourier Transform (FFT) size may be equal to 128, 256, 512, 1024 or 2048 for a system bandwidth of 1.25, 2.5, 5, 10 or 20 megahertz (MHz), respectively. The system bandwidth may be partitioned into sub-bands. For example, a sub-band may cover 1.08 MHz (i.e., 6 resource blocks), and there may be 1, 2, 4, 8 or 16 sub-bands for system bandwidth of 1.25, 2.5, 5, 10 or 20 MHz, respectively.

Figure 2:
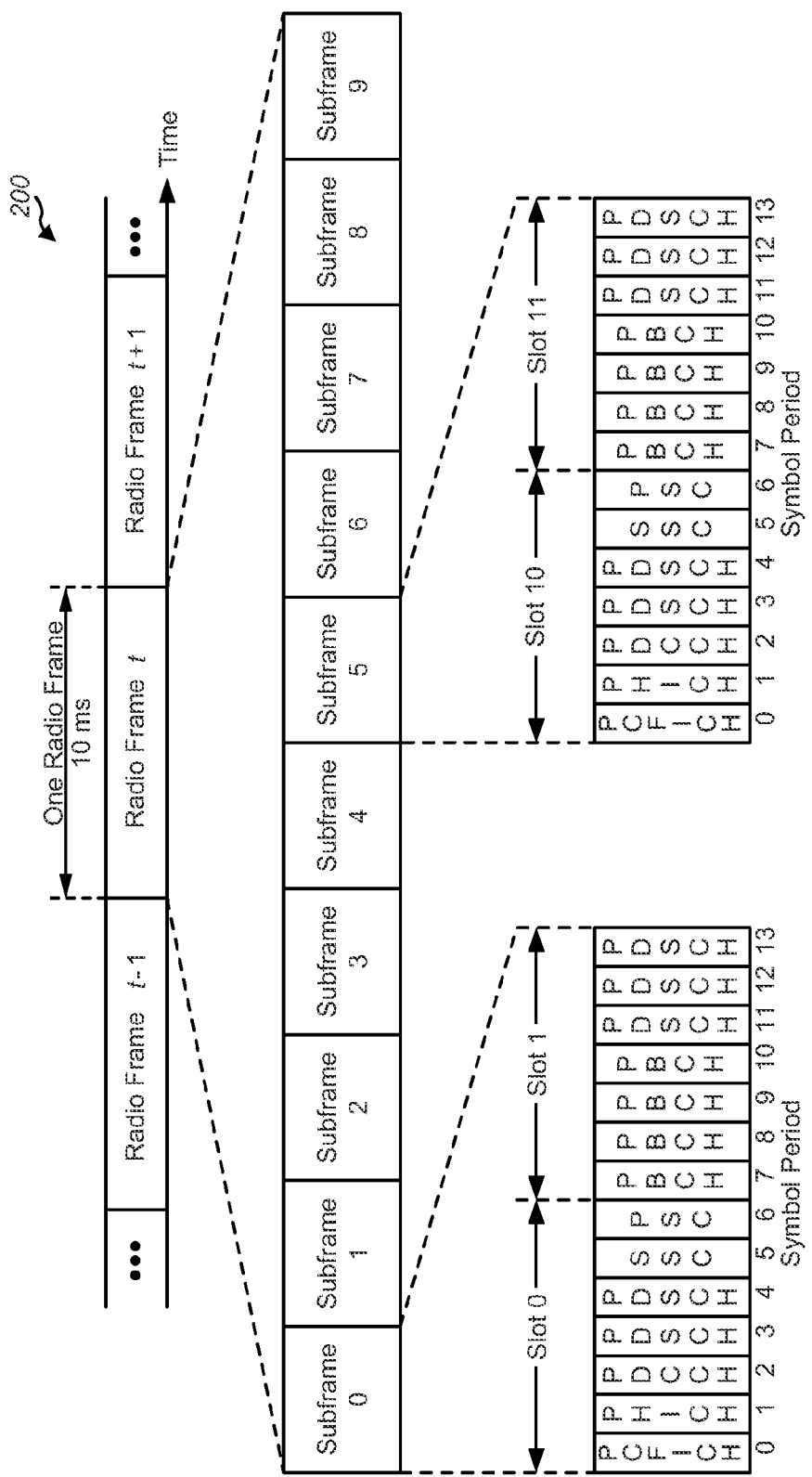
FIG. 2 is a block diagram conceptually illustrating an example of a down link frame structure that may be used in the telecommunications system of FIG. 1, which has aspects for allocating user equipment processing capability among multiple access nodes.

Referring to FIG. 2, a down link frame structure 200 may be used in the telecommunications system 100 of FIG. 1, which is configured to allocate user equipment processing capability among multiple access nodes according to the present aspects. The transmission timeline for the downlink may be partitioned into units of radio frames. Each radio frame may have a predetermined duration (e.g., 10 milliseconds (ms)) and may be partitioned into 10 sub-frames having indices 0 through 9. Each sub-frame may include two slots. Each radio frame may thus include 20 slots having indices 0 through 19. Each slot may include L symbol periods, where L may be, for example, 7 symbol periods for a normal cyclic prefix (as shown in FIG. 2) or 14 symbol periods for an extended cyclic prefix (not shown). The 2 L symbol periods in each sub-frame may be assigned indices of 0 through 2 L−1. The available time frequency resources may be partitioned into resource blocks. Each resource block may cover N subcarriers (e.g., 12 subcarriers) in one slot.

In LTE for example, an eNodeB, such as one of eNodeBs 110 of FIG. 1, may send a primary synchronization signal (PSS) and a secondary synchronization signal (SSS) for each cell in the coverage area of the eNodeB. The primary synchronization signal (PSS) and secondary synchronization signal (SSS) may be sent in symbol periods 6 and 5, respectively, in each of sub-frames 0 and 5 of each radio frame with the normal cyclic prefix, as shown in FIG. 2. The synchronization signals may be used by UEs, such as, for example, UEs 120 of FIG. 1, for cell detection and acquisition.

The eNodeB 110 may send system information on a Physical Broadcast Channel (PBCH) in symbol periods 0 to 3 of slot 1 of sub-frame 0. The eNodeB 110 may send information on a Physical Control Format Indicator Channel (PCFICH) in only a portion of the first symbol period of each sub-frame (although FIG. 2 depicts information being sent on the PCFICH in the entire first symbol period). The PCFICH may convey the number of symbol periods (M) used for control channels, where M may have a value of 1, 2 or 3 and may change from sub-frame to sub-frame. M may have a value of 4 for a small system bandwidth, e.g., less than 10 resource blocks. In the example shown in FIG. 2, M=3.

The eNodeB 110 may send information on a Physical HARQ Indicator Channel (PHICH) and a Physical Downlink Control Channel (PDCCH) in the first M symbol periods of each sub-frame (e.g., M=3 in FIG. 2). The PHICH may carry information to support hybrid, automatic retransmission (HARQ). The PDCCH may carry information related to uplink and downlink resource allocation for UEs 120 and power control information for uplink channels. It may be understood that the PDCCH and PHICH are also included in the first symbol period even though they are not shown as such in FIG. 2, Similarly, the PHICH and PDCCH are also both included in the second and third symbol periods, although, again, they are not shown as such in FIG. 2.

The eNodeB 110 may send information on a Physical Downlink Shared Channel (PDSCH) in the remaining symbol periods of each sub-frame. The PDSCH may carry data for UEs 120 scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNodeB 110 may send the PSS, SSS and PBCH around the center 1.08 MHz of the system bandwidth used by the eNodeB. The eNodeB 110 may send the PCFICH and PHICH across the entire system bandwidth in each symbol period in which these channels are sent. The eNodeB 110 may send the PDCCH to groups of UEs 120 in certain portions of the system bandwidth. The eNodeB 110 may send the PDSCH to specific UEs 120 in specific portions of the system bandwidth. The eNodeB 110 may send the PSS, SSS, PBCH, PCFICH and PHICH in a broadcast manner to all UEs 120 in the coverage area. The eNodeB 110 may send the PDCCH in a unicast manner to specific UEs 120 in the coverage area. The eNodeB 110 also may send the PDSCH in a unicast manner to specific UEs 120 in the coverage area.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread, across frequency, in one or more configurable symbol periods. For example, the three REGs for the PHICH may all be included in symbol period 0 or may be spread across symbol periods 0, 1, and 2. The PDCCH may occupy 9, 18, 32, or 64 REGs, which may be selected from all available REGs, in the first M symbol periods. Only certain combinations of REGs may be allowed for the PDCCH.

A UE 120 may know the specific REGs used for the PHICH and the PCFICH, but may have to search different combinations of REGs for the PDCCH. The number of combinations to be searched is typically less than the number of allowed combinations for the PDCCH. An eNodeB 110 may send the PDCCH to a UE 120 in any of the combinations that the UE will search.

A UE 120 may be within the coverage areas of multiple eNodeBs 110. One of these eNodeBs 110 may be selected to serve the UE 120. The serving eNodeB 110 may be selected based on various criteria such as received power, path loss, signal-to-noise ratio (SNR), and/or the like. In an aspect, a UE 120 within the coverage areas of one or more eNodeBs 110 also may be within the coverage area of one or more Wi-Fi access points. A UE 120 configured to operate according to dual connectivity may be simultaneously in communication with more than one access node, such as, in a non-limiting example, two (or more) eNodeBs 110, two (or more) Wi-Fi access points (not shown), or one (or more) eNodeB 110 and one (or more) Wi-Fi access point (not shown).

Figure 3:
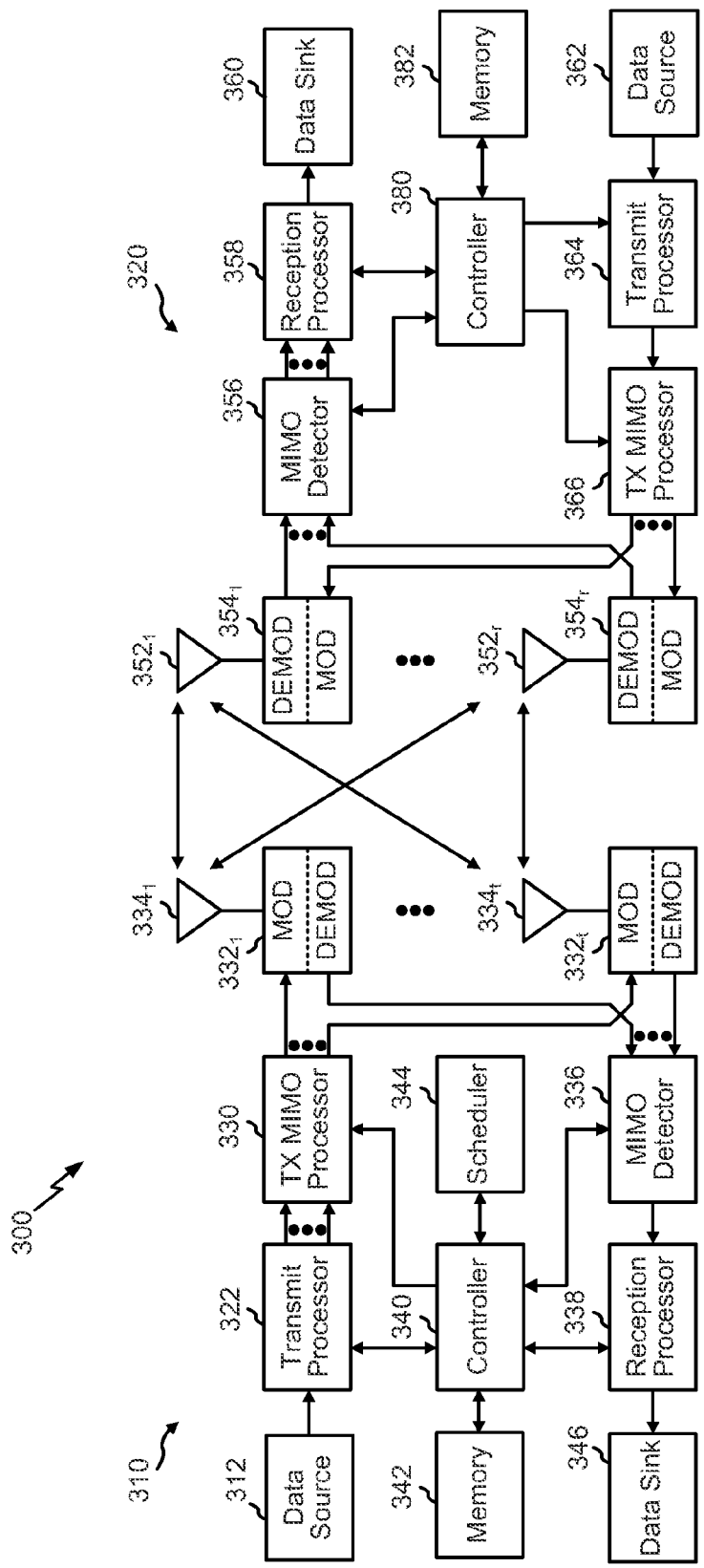
FIG. 3 is a block diagram conceptually illustrating an exemplary eNodeB and an exemplary user equipment in communication with one another in the telecommunications system of FIG. 1, which has aspects for allocating user equipment processing capability among multiple access nodes.

Referring to FIG. 3, an exemplary eNodeB 310 and an exemplary UE 320 may be in communication with one another within a telecommunications system 300, which may be the same as or similar to telecommunications system 100 of FIG. 1, which is configured to allocate user equipment processing capability among multiple access nodes according to the present aspects. In an aspect, eNodeB 310 may be one of eNodeBs 110 of FIG. 1 and UE 320 may be one of UEs 120 of FIG. 1. The eNodeB 310 may be equipped with antennas $334_1$ to $334_t$, and the UE 320 may be equipped with antennas $352_1$ to $352_r$, wherein t and r are integers greater than or equal to one.

At the eNodeB 310, a base station transmit processor 322 may receive data from a base station data source 312 and control information from a base station controller 340. In an aspect, the base station controller 340 may comprise a processor and, therefore, may also be referred to as base station processor 340 or base station controller 340. Control information may be carried on the PBCH, PCFICH, PHICH, PDCCH, and/or the like, while data may be carried on the PDSCH and/or the like. The base station transmit processor 322 may process (e.g., encode and symbol map) data and control information to obtain data symbols and control symbols, respectively. The base station transmit processor 322 may generate reference symbols, e.g., for the PSS, SSS, and cell-specific reference signal (RS). A base station transmit (TX) multiple-input multiple-output (MIMO) processor 330 may perform spatial processing (e.g., precoding) on the data symbols, the control symbols, and/or the reference symbols, if applicable, and may provide output symbol streams to the base station modulators/demodulators (MODs/DEMODs) $332_1$ to $332_t$. Each base station modulator/demodulator $332_1$ to $332_t$ may process a respective output symbol stream (e.g., for OFDM, etc.) to obtain an output sample stream. Each base station modulator/demodulator $332_1$ to $332_t$ may further process (e.g., convert to analog, amplify, filter, and up-convert) the output sample stream to obtain a downlink signal. Downlink signals from modulators/demodulators $332_1$ to $332_t$ may be transmitted via the antennas $334_1$ to $334_t$, respectively.

At the UE 320, the UE antennas $352_1$ to $352_r$ may receive downlink signals from the eNodeB 310 and may provide received signals to the UE modulators/demodulators (MODs/DEMODs) $354_1$ to $354_r$, respectively. Each UE modulator/demodulator $354_1$ to $354_r$ may condition (e.g., filter, amplify, down-convert, and digitize) a respective received signal to obtain input samples. Each UE modulator/demodulator $354_1$ to $354_r$ may further process the input samples (e.g., for OFDM and/or the like) to obtain received symbols. A UE MIMO detector 356 may obtain received symbols from all the UE modulators/demodulators $354_1$ to $354_r$, perform MIMO detection on the received symbols, if applicable, and provide the detected symbols. A UE reception processor 358 may process (e.g., demodulate, deinterleave, and decode) the detected symbols, provide decoded data for the UE 320 to a UE data sink 360, and provide decoded control information to a UE controller 380. In an aspect, the UE controller 380 may comprise a processor and, therefore, may also be referred to as UE processor 380 or UE controller/processor 380.

On the uplink, at UE 320, a UE transmit processor 364 may receive and process data (e.g., for the PUSCH) from a UE data source 362 and control information (e.g., for the PUCCH) from the UE controller 380. The UE transmit processor 364 may generate reference symbols for a reference signal. The symbols from the UE transmit processor 364 may be preceded by a UE TX MIMO processor 366, if applicable, further processed by the UE modulator/demodulators $354_1$ to $354_r$ (e.g., for SC-FDM and/or the like), and transmitted to the eNodeB 310. At the eNodeB 310, the uplink signals from the UE 320 may be received by the base station antennas $334_1$ to $334_t$, processed by the base station modulators/demodulators $332_1$ to $332_t$, detected by a base station MIMO detector 336, if applicable, and further processed by a base station reception processor 338 to obtain decoded data and control information sent by the UE 320. The base station reception processor 338 may provide the decoded data to a base station data sink 346 and the decoded control information to the base station controller 340.

The base station controller 340 and the UE controller 380 may direct operations at the eNodeB 310 and the UE 320, respectively. The base station controller 340 and/or other processors and modules at the eNodeB 310 may perform, or direct the execution of, one or more processes to implement the functions described herein for allocating processing capability of a UE (e.g., UE 320, which may be one of UEs 120 of FIG. 1) among multiple access nodes (e.g., eNodeB 310, which may be one of eNodeBs 110 of FIG. 1 and/or one or more other eNodeBs 110 of FIG. 1 or Wi-Fi access points). The base station memory 342 and the UE memory 382 may store data and program codes used by the eNodeB 310 and the UE 320, respectively, to implement the functions described herein. A scheduler 344 at eNodeB 310 may schedule UEs 320 for data transmission on the downlink and/or uplink.

In one configuration, the eNodeB 310, which may be one of eNodeBs 110 of FIG. 1, may include means for determining user equipment processing capability. For example, eNodeB 310 may include means for determining processing capability at UE 320, which may be one of UEs 120 of FIG. 1. In one configuration, the eNodeB 310 also may include means for determining a first allocation of the user equipment processing capability (e.g., the processing capability of UE 320) for a first access node (e.g., eNodeB 310, which may be one of eNodeBs 110 of FIG. 1 or a Wi-Fi access point) or a second allocation of the user equipment processing capability (e.g., the processing capability of UE 320) for a second access node (e.g., another one of the eNodeBs 110 of FIG. 1 or a Wi-Fi access point) when the user equipment is in communication with at least the first access node and the second access node. In one configuration, the eNodeB 310 also may include means for assigning resources for the user equipment (e.g., UE 320) based at least in part on the first allocation or the second allocation. In one aspect, the aforementioned, means may be the base station controller 340, the base station memory 342, the base station modulators/demodulators 332, the base station scheduler 344, and the base station antennas $334_1$ to $334_t$ configured to perform the functions recited by the aforementioned means. In another aspect, the aforementioned means may be a module or any apparatus configured to perform the functions recited, by the aforementioned means.

Figure 4:
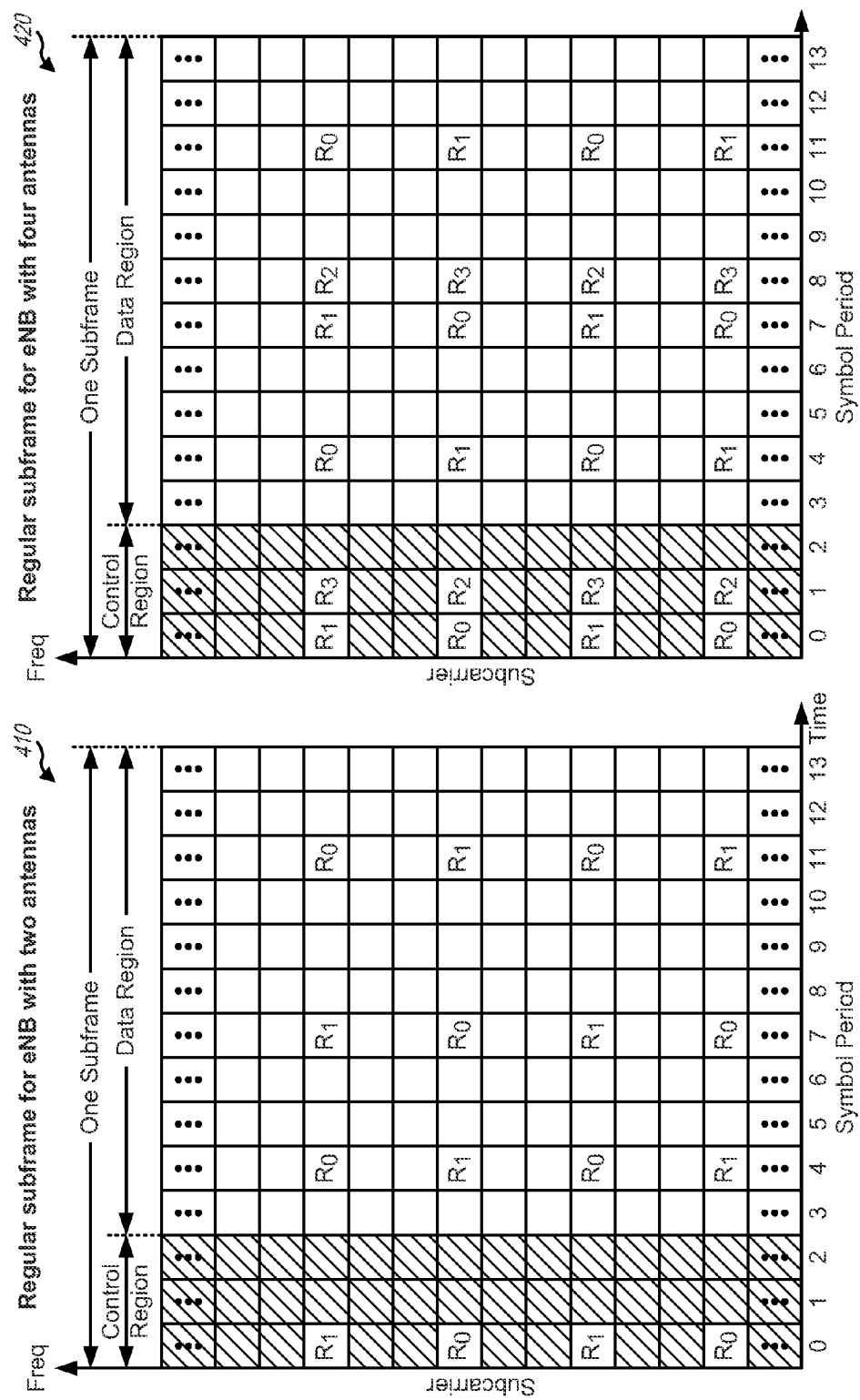
FIG. 4 is a block diagram conceptually illustrating exemplary subframe resource element mapping that may be used in the telecommunications system of FIG. 1, which has aspects for allocating user equipment processing capability among multiple access nodes.

Referring to FIG. 4, two exemplary subframe formats 410 and 420 for the downlink may be used in the telecommunications system 100 of FIG. 1, which is configured to allocate user equipment processing capability among multiple access nodes according to the present aspects. Subframe formats 410 and 420 may be exemplary for the downlink when there is a normal cyclic prefix.

The available time frequency resources for the downlink may be partitioned into resource blocks. Each resource block may include 12 subcarriers in one slot and may include a number of resource elements. Each resource element may correspond to one subcarrier in one symbol period and may be used to send one modulation symbol, which may be a real or complex value.

The subframe format 410 may be used for an eNodeB, such as, for example, one of eNodeBs 110 of FIG. 1, equipped with two antennas. A common reference signal (CRS) may be transmitted from antennas 0 and 1 in symbol periods 0, 4, 7, and 11. A common reference signal (CRS) is a signal that is known a priori by a transmitter and a receiver and may also be referred to as a pilot signal. A common reference signal (CRS) may be a reference signal that is specific for a cell, e.g., generated based on a cell identity (ID). In the example of FIG. 4, for a given resource element with label Ra, a modulation symbol may be transmitted on the given resource element from antenna a, and no modulation symbols may be transmitted on the given resource element from other antennas.

The subframe format 420 may be used for an eNodeB, such as, for example, one of eNodeBs 110 of FIG. 1, equipped with four antennas. A common reference signal (CRS) may be transmitted, from, antennas 0 and 1 in symbol periods 0, 4, 7, and 11 and from antennas 2 and 3 in symbol periods 1 and 8.

For both subframe formats 410 and 420, a CRS may be transmitted on evenly spaced subcarriers, which may be determined based on cell ID. Different ones of eNodeBs 110 may transmit their CRSs on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used on each of the downlink and uplink for FDD in a communication network (e.g., LTE network). For example, Q interlaces, having indices of 0 through Q−1, may be defined, where Q is 4, 6, 8, 10, or some other value. Each interlace may include subframes that may be spaced apart by Q frames. In particular, interlace q may include subframes q, q+Q, q+2Q, etc., where q∈{0, ..., Q−1}.

The telecommunications system 100 of FIG. 1 may support hybrid automatic retransmission (HARQ) for data transmission on the downlink and uplink. For HARQ, a transmitter (e.g., at an eNodeB 110) may send one or more transmissions of a data packet until the data packet is decoded correctly by a receiver (e.g., at a UE 120) or some other termination condition is encountered. For synchronous HARQ, all transmissions of the data packet may be sent in subframes of a single interlace. For asynchronous HARQ, each transmission of the data packet may be sent in any subframe.

As noted above, one of UEs 120 of FIG. 1 may be located within the geographic coverage area of multiple eNodeBs 110 of FIG. 1 (and/or Wi-Fi access points). One of the eNodeBs 110 may be selected to serve each of the UEs 120 and, as such, may be referred to thereafter as a "serving eNodeB," while other, non-serving eNodeB(s) in the vicinity may be referred to as "neighboring eNodeB(s)." One of eNodeBs 110 may be selected as the serving eNodeB for one of UEs 120 based on various criteria such as received signal strength, received signal quality, pathloss, and/or the like. Received signal quality may be quantified by a signal-to-noise-and-interference ratio (SINR), a reference or pilot signal received quality (RSRQ), and/or some other metric. Each of UEs 120 may operate in a dominant interference scenario in which one of UEs 120 may observe high interference from one or more of eNodeBs 110 that are not its serving eNodeB, e.g., the neighboring eNodeBs.

Figure 5:
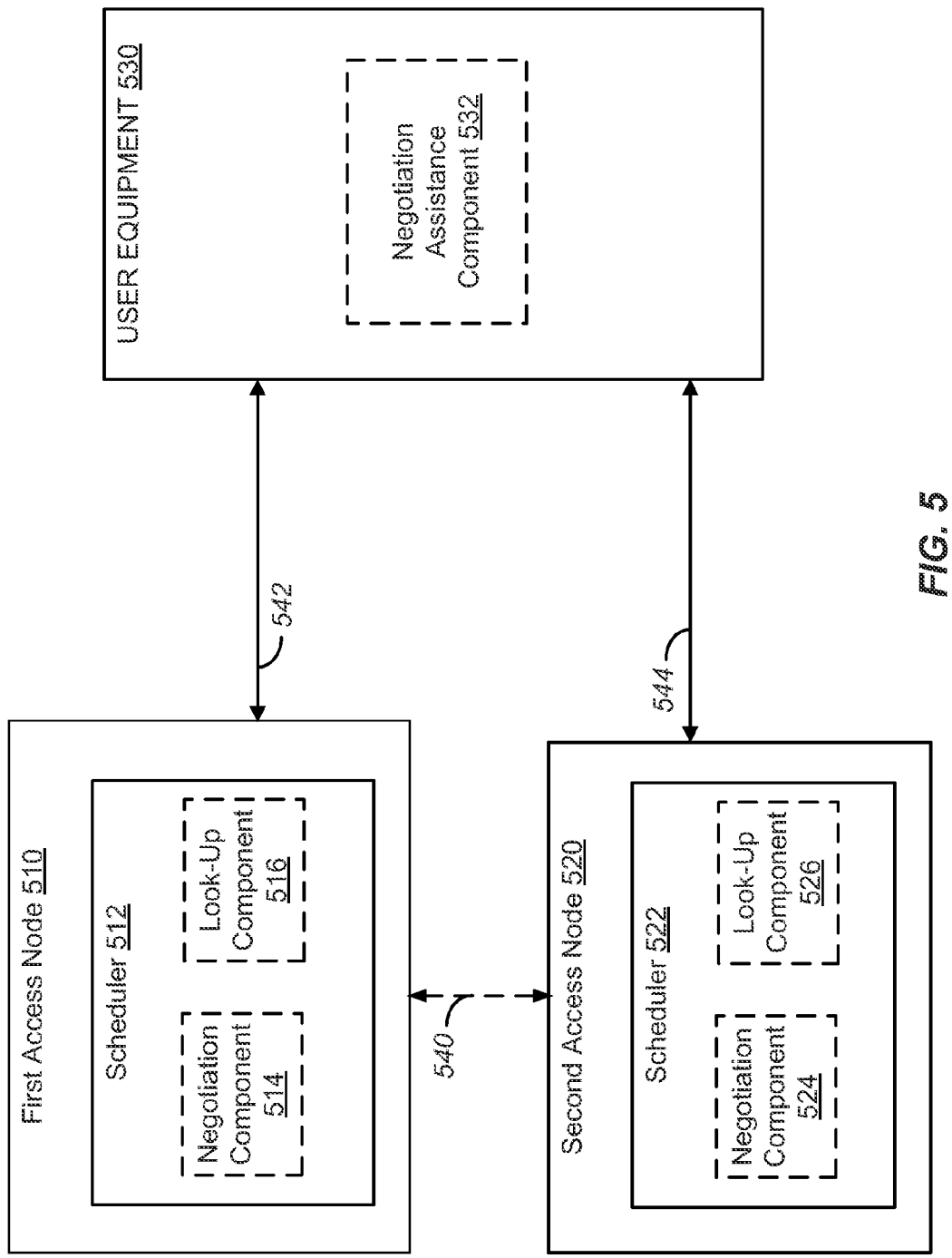
FIG. 5 is a block diagram conceptually illustrating aspects of an exemplary user equipment and exemplary access nodes within the telecommunications system of FIG. 1, which has aspects for allocating user equipment processing capability among multiple access nodes.

Referring to FIG. 5, a UE 530 may be in communication with a first access node 510 and a second access node 520. In an aspect, first access node 510 and second access node 520 may be associated with different RATs (e.g., a Wi-Fi access point and an eNodeB). In another aspect, first access node 510 and second access node 520 may be associated with the same RAT (e.g., two Wi-Fi access points or two eNodeBs). In one aspect, and for example, UE 530 may be an example of UE 120y (FIG. 1), first access node 510 may be an example of macro eNodeB 110c (FIG. 1), and second access node 520 may be an example of a small cell such as femto eNodeB 110y (FIG. 1). It will be understood that the example of FIG. 5 is a non-limiting one and that is provided for illustration purposes only. The present aspects as described herein may apply equally to any of the eNodeBs 110 shown in FIG. 1 in addition to any Wi-Fi access points with which one or more of UEs 120 of FIG. 1 are in communication.

In the example of FIG. 5, UE 530 is in communication with both first access node 510 (via a communication connection 542) and second access node 520 (via a communication connection 544). First access node 510 and second access node 520 are optionally in direct communication with one another (via optional communication connection 540540) through, for example, a backhaul or X2 connection.

First access node 510 includes scheduler 512, and, similarly, second access node 520 includes scheduler 522, both of which may be the same as or similar to scheduler 344 of FIG. 3. Scheduler 512 and scheduler 522 may generally be configured to determine a portion of a total processing capability at UE 530 that it may use to schedule UE 530 when UE 530 is operating according to dual connectivity and is connected to at least first access node 510 and second access node 520. In one example, scheduler 512 may be configured to determine a first allocation of the UE 530 processing capability to be used for first access node 510 and scheduler 522 may be configured to determine a second allocation of the UE 530 processing capability for second access node 520. In an aspect, alternatively or additionally, each of scheduler 512 and 522 may be configured to determine an allocation of UE 530 processing capability for the other respective access node (e.g., scheduler 512 may be configured to determine an allocation for second access node 520). In an example, but not limited hereto, the first allocation of the UE 530 processing capability and the second allocation of the UE 530 processing capability sum to equal a value that does not exceed a value of the processing capability of UE 530.

In an aspect, each of schedulers 512 and 522 may be configured to determine an allocation for its respective access node, and/or the other access node, based on at least one network condition and/or at least one non-network condition. The network condition may be a quality of service (QoS) of data flow for first access node 510 and/or second access node 520. The network condition may be a radio condition, such as, for example, a received signal, signal-plus-interference-to-noise ratio (SINR), and/or pathloss observed by first access node 510 and/or second access node 520. The network condition may be a load condition of first access node 510 and/or second access node 520. The network condition may be a capability of first access node 510 and/or second access node 520, such as, for example, a processing capability and/or a throughput capability. The network condition may be a backhaul performance (e.g., performance of communication connection 540) between first access node 510 and second access node 520, such as, for example, backhaul capacity, backhaul throughput, and/or backhaul delay. The network condition may be a data buffer status observed by UE 530, first access node 510 and/or second access node 520. In an aspect, each of schedulers 512 and 522 may be configured to determine an allocation for its respective access node based on at least one non-network-related condition.

According to a first aspect, and optionally, scheduler 512 and scheduler 522 may include negotiation component 514 and negotiation component 524, respectively, at least one of which is configured to determine that UE 530 is operating according to dual connectivity and is connected to the other eNodeB (e.g., negotiation component 514 may be configured to determine that UE 530 is also in communication with second access node 520). In an aspect, each of negotiation components 514 and 524 also may be configured to determine a first allocation of UE 530 processing capability for its respective eNodeB (e.g., negotiation component 514 determines a first allocation for first access node 510) or a second allocation of UE 530 processing capability for the other eNodeB (e.g., negotiation component 514 determines a second allocation for second access node 520) when UE 530 is in communication with at least first access node 510 and second access node 520. Negotiation components 514 and 524 may do so by negotiating with the other eNodeB (e.g., negotiation component 514 may negotiate with second access node 520) to determine the first allocation for its respective eNodeB and the second allocation for the other eNodeB such that a total of the first allocation and the second allocation does not exceed the total processing capability for UE 530.

In an aspect, and for example, negotiation component 514 may be configured, to negotiate with second access node 520, e.g., via negotiation component 524, by determining a first allocation request for first access node 510, sending the first allocation request to second access node 520, and receiving a response from the second access node 520 including a second allocation request, such that a total of the first allocation request and the second allocation request does not exceed the total UE 530 processing capability. In another aspect, and for example, negotiation component 514 may be configured to negotiate with second access node 520, e.g., via negotiation component 524, by receiving a second allocation request from second access node 520, and determining the first allocation based on the total UE 530 processing capability and the second allocation request such that a total of the first allocation and the second allocation does not exceed the total UE 530 processing capability.

In an aspect, and for example, negotiation component 514 may be configured to negotiate with second access node 520, e.g., via negotiation component 524, by determining the second allocation, e.g., for second access node 520, as described above, and, communicating the second allocation to second access node 520. In another aspect, and for example, negotiation component 514 may be configured to negotiate with second access node 520 by receiving the first allocation, e.g., for first access node 510, from second access node 520, e.g., via negotiation component 524. During an allocation negotiation, negotiation components 514 and 524 may be configured to determine if one of first access node 510 and second access node 520 has priority over the other and, as such, determine an appropriate allocation split based on the priority and/or the network or non-network conditions, as described herein. Information related to such priority may be determined at the access node, configured and provided, by UE 530, and/or configured and provided by telecommunications system 100. In any event, negotiation components 514 and 524 may be configured to re-negotiate the first allocation and the second allocation at any time, according to a preset re-negotiate schedule, upon the occurrence of a trigger or event, and/or the like. In each of the above aspects, negotiation component 524 may be configured to operate in a similar fashion as negotiation component 514.

The first allocation and the second allocation of UE 530 processing capability may be the same for all subframes across a frame or the first allocation and the second allocation may be different for at least some of the subframes across a frame, which are shown in and described with respect to FIG. 2.

Optionally, in an aspect, UE 530 may include negotiation assistance component 532 configured to facilitate a negotiation between two access nodes (e.g., first access node 510 and second access node 520 and their respective negotiation components 514 and 524) when the access nodes are not in communication with one another, e.g., communication connection 540 is not available. This scenario may occur, for example, when two access nodes are associated with different RATs, when there is a problem with, and/or constraint on, the backhaul connection between two eNodeBs, and/or the like. In one example, negotiation assistance component 532 may be configured to receive a communication (which may be generated by, for example, negotiation component 514) from first access node 510 over communication connection 542. The communication may include negotiation information for allocating the UE 530 processing capability between first access node 510 and second access node 520. Negotiation assistance component 532 may be configured to receive the communication and pass it along to second access node 520, where if may be received and processed (by, for example, negotiation component 524). Negotiation assistance component 532 may be configured to operate similarly when it receives a negotiation-related communication from second access node 520 on communication connection 544. In an aspect, negotiation assistance component 532 may be configured to perform some processing on the communication; in another aspect, negotiation assistance component 532 may function simply as an intermediary.

In an aspect, UE 520 may be configured to provide a category associated with the UE 520 (which may be referred to as UE-category) to first access node 510 (via communication connection 542) and/or second access node 520 (via communication connection 544). In an aspect, UE 520 also may be configured to provide network condition measurement report(s) to first access node 510 (via communication connection 542) and/or second access node 520 (via communication connection 544). The category for UE 520 and/or the measurement report(s) may be used by first access node 510 and/or second access node 520 to assist with determining the first allocation and the second allocation of the total UE 530 processing capability.

According to a second aspect, and optionally, each of schedulers 512 and 522 may include a look-up component 516 and 526, respectively, configured to determine a pre-configured allocation of UE 530 processing capability for its respective eNodeB. More particularly, and for example, look-up component 516 may be configured to determine a first allocation of UE 530 processing capability for first access node 510 by receiving information related to a category for UE 530, determining that UE 530 is operating according to dual connectivity, and retrieving UE 530 processing capability information, including dual connectivity allocation information, based on the category. In an aspect, UE 530 may provide its category, processing capability, dual connectivity allocation information, and/or a rule related to processing capability allocation, to first access node 510 and/or second access node 520 via communication connections 542 and 544, respectively. The category (which may be referred to as UE-Category) to which UE 530 belongs may indicate the UE 530 processing capability, along with a pre-determined split of that processing capability to be used by two (or more) access nodes when the UE 530 is operating according to dual connectivity. Such categories are described in 3GPP TS 36.306, entitled "Evolved Universal Terrestrial Radio Access (E-UTRA); User Equipment (UE) radio access capabilities." Look-up component 516 may be further configured to determine the first allocation for first access node 510 and/or the second allocation for second access node 520, based on the dual connectivity allocation information for UE 530 according to its category. Look-up component 526 may be configured to operate in a similar fashion as look-up component 516. In an aspect, the information included in look-up component 516 and look-up component 526 may be updated periodically by, for example, the network, based on a change in network conditions, a change in the dual connectivity allocation information for UE 530, a change in UE 530 category, and/or the like.

In any case, once an allocation is determined, scheduler 512 and 522 may be configured to schedule or assign resources (see e.g., FIG. 4) for UE 530 for first access node 510 and second access node 520, respectively, based at least in part on the first allocation and/or the second allocation.

Figure 6:
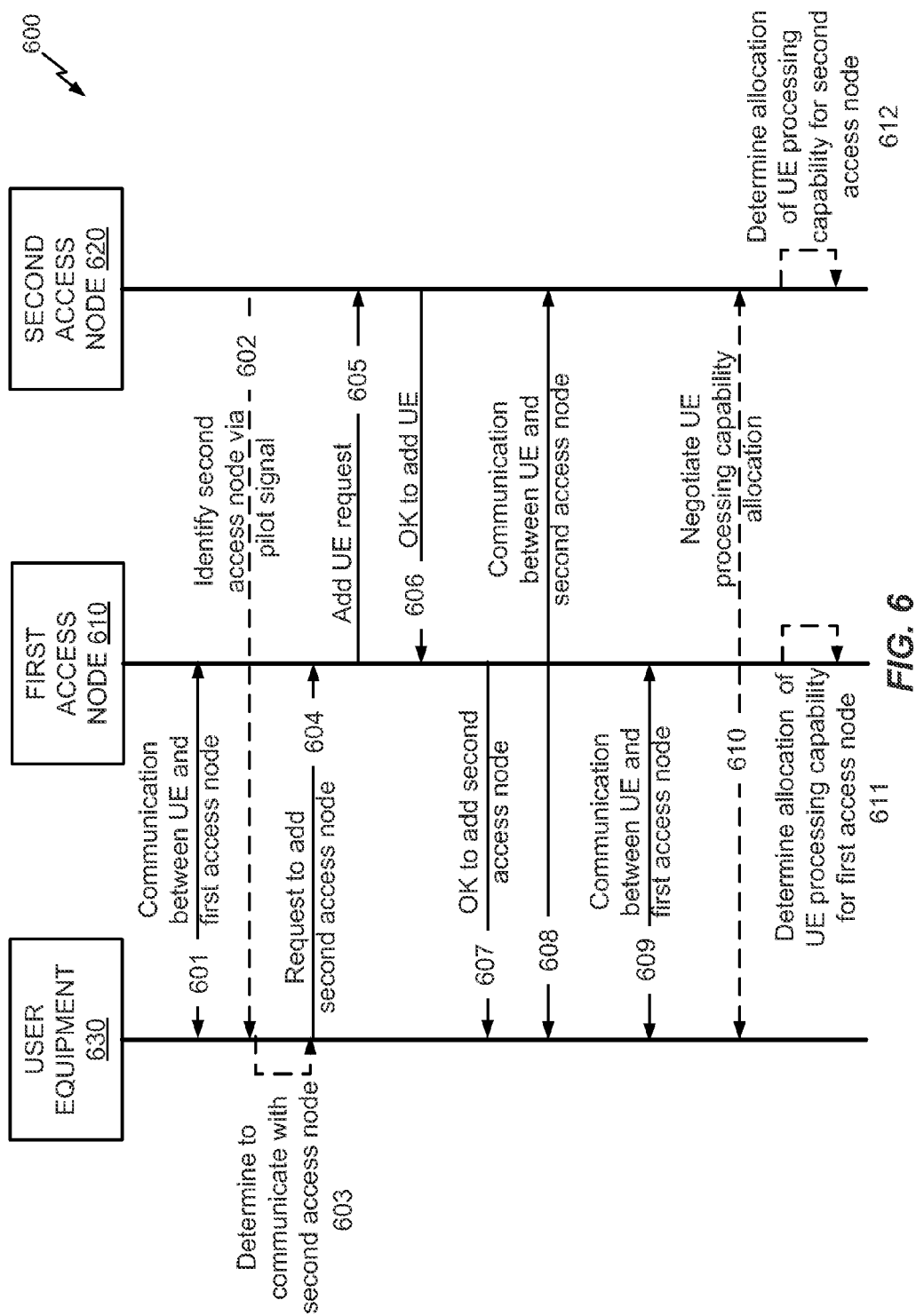
FIG. 6 is a call flow diagram illustrating communications, according to a first aspect, between an exemplary user equipment and exemplary access nodes within the telecommunications system of FIG. 1, which has aspects for allocating user equipment processing capability among multiple access nodes.
Figure 7:
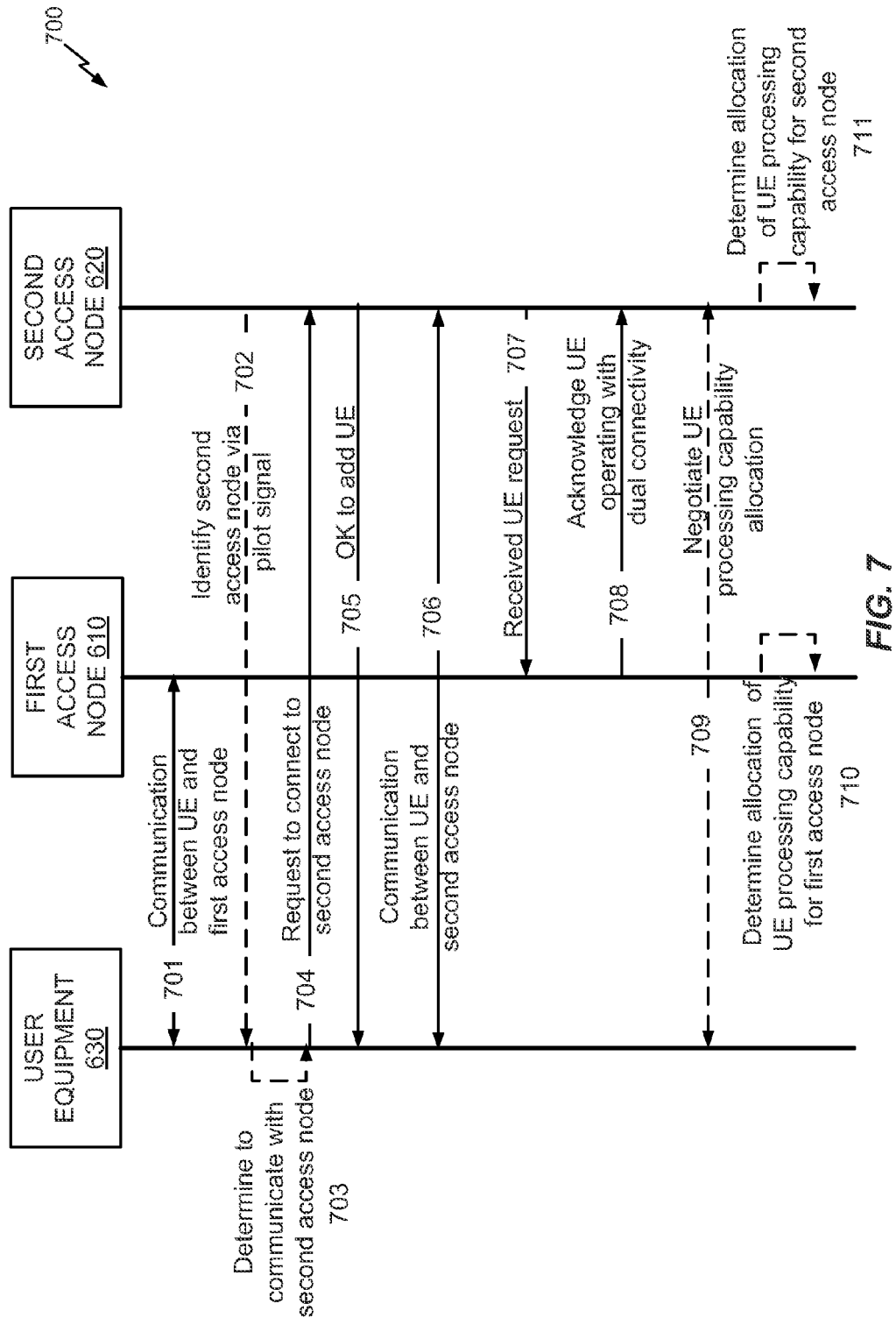
FIG. 7 is a call flow diagram illustrating communications, according to a second aspect, between an exemplary user equipment and exemplary access nodes within the telecommunications system of FIG. 1 having aspects for allocating user equipment processing capability among multiple access nodes.

In FIGS. 6 and 7, two call flows 600 and 700 include communications between a UE 630, a first access node 610, and a second access node 620. In an aspect, first access node 610 and second access node 620 may be associated with the same RAT. For example, first access node 610 and second access node 620 may each be an eNodeB or a Wi-Fi access point. In another aspect, first access node 610 and second access node 620 may be associated with different RATs. For example, first access node 610 and second access node 620 may be one each of an eNodeB and a Wi-Fi access node. In an aspect, and one non-limiting example, UE 630 may be an example of any one of UEs 120 (FIG. 1), first access node 610 may be an example of macro eNodeB 110c (FIG. 1), and second access node 620 may be an example of a small cell such as femto eNodeB 110y (FIG. 1). In the example of FIGS. 6 and 7, first access node 610 and second access node 620 may be in communication with one another either directly (e.g., via a backhaul or communication connection 540 as shown in FIG. 5) or indirectly (e.g., using UE 530 as an intermediary via negotiation assistance component 532 as shown in FIG. 5).

Referring to FIG. 6, in an example of a call flow 600, at 601, UE 630 is shown as being in communication with first access node 610, such that first access node 610 is the serving eNodeB for UE 630. UE 630, which may operate according to dual connectivity, identifies, at 602, second access node 620 based on, for example, receipt of a pilot/reference signal from second access node 620. At 603, UE 630 determines to communicate with second access node 620 in addition to first access node 610. At 604, UE 630 sends a request to first access node 610 to indicate its intent to simultaneously communicate with second access node 620. At 605, first access node 610 forwards the request to second access node 620, since the two access nodes are in communication with one another. In response, and at 606, first access node 610 receives a communication indicating that UE 630 may communicate with second access node 620. At 607, first access node 610 forwards the communication to UE 630. UE 630 and second access node 620 are then shown, at 608, as being in communication with one another while UE 630 is also simultaneously in communication with first access node 610, at 609.

Referring now to FIG. 7, in another example of a call flow 700, and at 701, first access node 610 is currently the serving node for UE 630 when UE 630, at 702 identifies second access node 620 via, for example, a reference or pilot signal. At 703, UE 630 determines to simultaneously communicate with second access node 620 and first access node 610. In the example of FIG. 7, and at 704, UE 630 sends a request to connect to second access node 620 directly thereto, and at 705, second access node 620 responds directly to UE 630. As such, and at 706, UE 630 is shown as now being in communication with both first access node 610 and second, access node 620. At 707, second access node 620 provides an indication of the request from UE 630 to first access node 610. Both second access node 620 and first access node 610 are now aware that UE 630 is operating according to dual connectivity. First access node 610, at 708, sends an acknowledgment to second access node 620.

Referring now to both FIG. 6 and FIG. 7, once UE 630 is in communication with first access node 610 and second access node 620, each of the access nodes may determine an allocation of the total processing capability of UE 630 that may be used by each of the respective access nodes to schedule UE 630. As shown in both call flows 600 and 700, at 610 and 709, respectively, and in an aspect, first access node 610 and second access node 620 may negotiate the allocations between themselves (either directly or by using UE 630 as a go-between) as described herein. In another aspect, first access node 610 and second access node 620, at 611 and 612 in FIG. 6 and at 710 and 711 in FIG. 7, may be configured to independently determine a respective allocation of UE 630 processing capability based on a pre-determined split of processing capability allocation, which may be determined based on a category of UE 630 as described herein.

Figure 8:
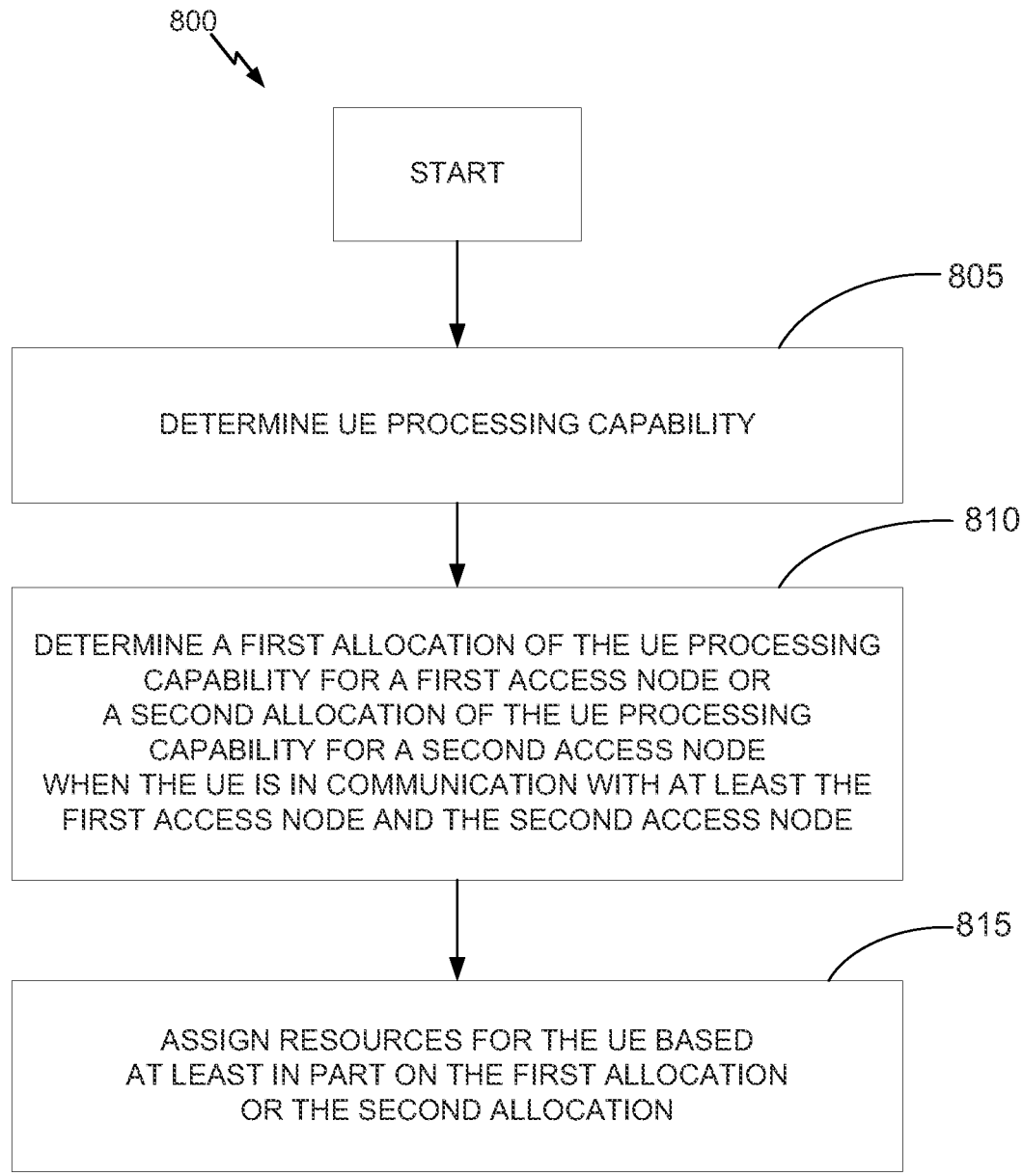
FIG. 8 is a flow chart of a method for allocating user equipment processing capability among multiple access nodes according to the present aspects.

Referring to FIG. 8, aspects of a method 800 for allocating user equipment processing capability among multiple access nodes may be performed by a scheduler (e.g., scheduler 512 and/or 522 of FIG. 5), a negotiation component (e.g., negotiation component 514 and/or 524 of FIG. 5), and/or a look-up component (e.g., look-up component 516 and/or 526 of FIG. 5) of any one of eNodeBs 110 of FIG. 1 and/or any Wi-Fi access point with which any one of UEs 120 of FIG. 1 is in communication. For simplicity, scheduler 512, negotiation component 514 and look-up component 516 of first access node 510 (as shown in FIG. 5) may be described as performing the actions of method 800 in relation to UE 530 (as shown in FIG. 5). However, such actions may be performed by the same or similar components included in any one of eNodeBs 110 of FIG. 1 and/or any Wi-Fi access points to which any one of UEs 120 of FIG. 1 are in communication.

At 805, the method 800 includes determining the user equipment processing capability. For example, scheduler 512 may be configured to determine processing capability for UE 530. UE 530 may provide information related to its processing capability to first access node 510 and/or first access node 510 may determine processing capability for UE 530 based on a UE-Category of UE 530.

At 810, the method 800 includes determining a first allocation of the user equipment processing capability for a first access node or a second allocation of the user equipment processing capability for a second access node when the user equipment is in communication with at least the first access node and the second access node. For example, negotiation component 514 and/or look-up component 516 may be configured to determine that UE 530 is in communication with at least two access nodes (e.g., first access node 510 and second access node 520 of FIG. 5 and/or first access node 610 and second access node 620 of FIGS. 6 and 7) as described herein with respect to FIGS. 6 and 7. In an aspect, the first access node and the second access node are associated with different RATs. In another aspect, the first access node and the second access node are associated with the same RAT.

Based thereon, and for example, negotiation component 514 and/or look-up component 516 may be configured to determine a first allocation of UE 530 processing capability for first access node 510 or a second allocation of UE 530 processing capability for second access node 520.

In an aspect, scheduler 512 includes negotiation component 514 configured to determine that UE 530 is in communication with the second access node. Negotiation component 514 also may be configured to negotiate with the second access node to determine the first allocation for the first access node and the second allocation for the second access node such that a total of the first allocation and the second allocation does not exceed the total UE 530 processing capability. In an aspect, negotiating with the second access node may include receiving a second allocation request from the second access node, and determining the first allocation based on the total UE 530 processing capability and the second allocation request such that a total of the first allocation and the second allocation does not exceed the total UE 530 processing capability. In another aspect, negotiating with the second access node may include determining a first allocation request, sending the first allocation request to the second, access node, and receiving a response from the second access node including a second allocation request, wherein a total of the first allocation request and the second allocation request does not exceed the total UE 530 processing capability. In yet another aspect, negotiating with the second access node may include communicating the second allocation to the second access node and/or receiving the first allocation from the second access node. In an aspect, the first allocation and the second allocation may be dynamic and re-negotiatiable.

In an aspect, negotiation component 514 may be configured to negotiate with the second access node using the UE 530 as a go-between, such that negotiation assistance component 532 is configured to receive and pass-along (with or without processing) allocation negotiation-related communications between the first access node and the second access node.

In an aspect, negotiation component 514 may be configured to determine the first allocation and the second allocation based on at least one network condition. The at least one network condition may be, for example, a quality of service (QoS) of data flow for at least one of the first access node and the second access node, a radio condition (e.g., a received signal, signal-plus-interference-to-noise ratio (SINR), and/or pathless) observed by at least one of the first access node and the second access node, a load condition of at least one of the first access node and the second access node, a capability (e.g., processing and/or throughput capability) of at least one of the first access node and the second access node, a backhaul performance (e.g., capacity, throughput, and/or delay) between the first access node and the second access node, and/or a data buffer status observed by at least one of UE 530, the first access node, and the second access node.

In an aspect, the first allocation and the second allocation of the user equipment processing capability are the same for all subframes across a frame. In another aspect, the first allocation and the second allocation of the user equipment processing capability are different for at least some subframes across a frame.

In an aspect, scheduler 512 includes look-up component 516 configured to receive information related to a category for UE 530 and retrieve UE 530 processing capability information based on the category, where the UE 530 processing capability information includes total user equipment processing capability and dual connectivity allocation information. Based thereon, look-up component may be further configured to determine the first allocation based on the dual connectivity allocation information.

At 815, the method 800 includes assigning resources for the user equipment based at least in part on the first allocation or the second allocation. For example, scheduler 512 may be configured to schedule or assign resources for UE 530 based at least in part on the first allocation and/or the second allocation determined by negotiation component 514 and/or look-up component 516.

Figure 9:
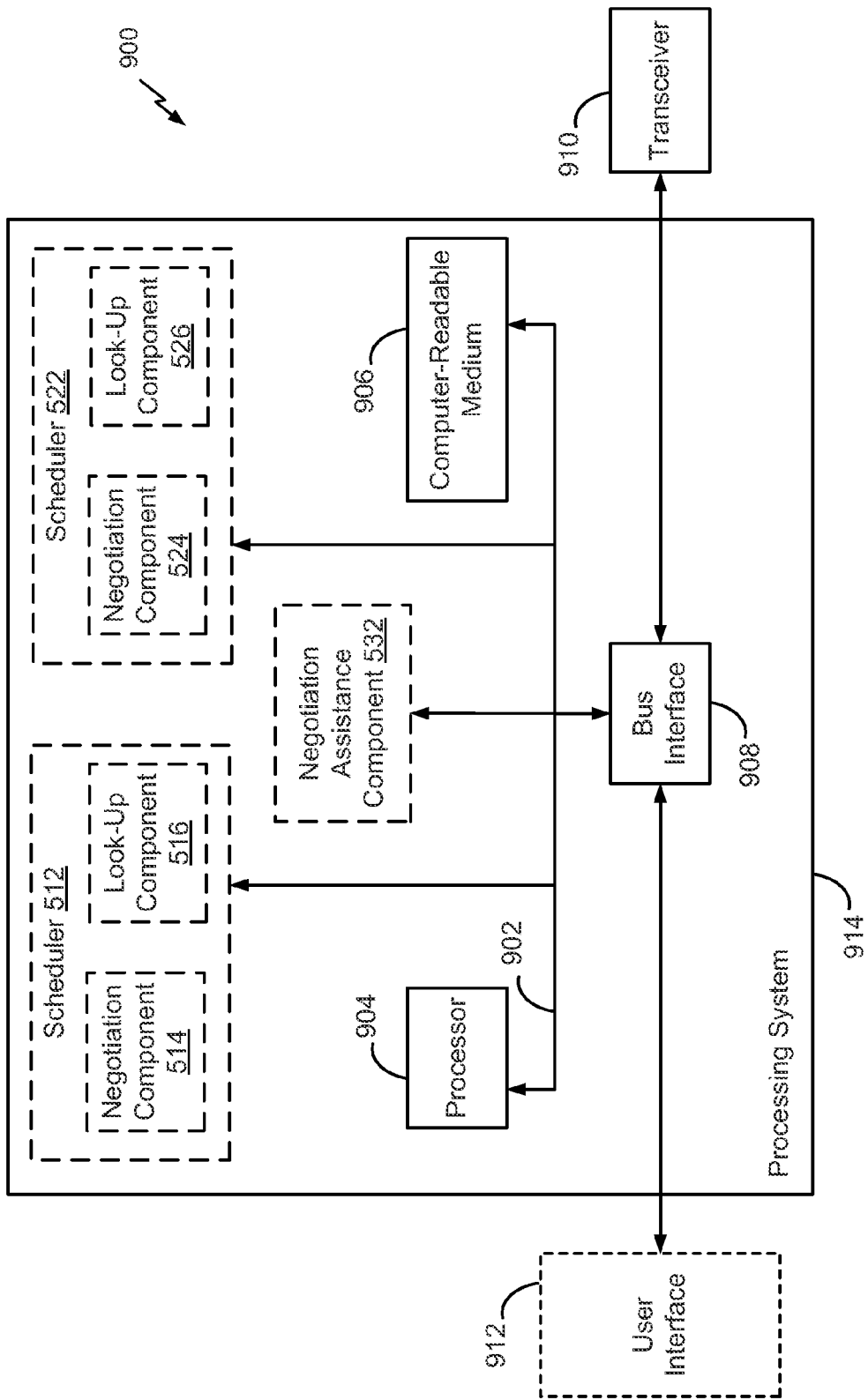
FIG. 9 is a diagram illustrating an example of a hardware implementation for an apparatus employing a processing system having aspects configured for allocating user equipment processing capability among multiple access nodes according to the present aspects.

Referring to FIG. 9, an example of a hardware implementation for an apparatus 900 employing a processing system 914 having aspects configured for allocating user equipment processing capability among multiple access nodes as described herein is shown. In this example, the processing system 914 may be implemented, with a bus architecture, represented generally by the bus 902. The bus 902 may include any number of interconnecting buses and bridges depending on the specific application of the processing system 914 and the overall design constraints. The bus 902 links together various circuits including one or more processors, represented generally by the processor 904 and computer-readable media, represented generally by the computer-readable medium 906. In an aspect where the apparatus 900 employing processing system 914 is one of eNodeBs 110 of FIG. 1 (e.g., first access node 510 and second access node 520 of FIG. 5 and/or first access node 610 and second access node 620 of FIGS. 6 and 7), the bus 902 also links scheduler 512 of first access node 510, which includes negotiation component 514 and/or look-up component 516, scheduler 522 of second access node 520, which includes negotiation component 524 and/or look-up component 526. In an aspect where the apparatus 900 employing processing system 914 is one of UEs 120 of FIG. 1 (e.g., UE 530 of FIG. 5 and/or UE 630 of FIGS. 6 and 7), the bus 902 also links negotiation assistance component 532. The bus 902 may also link various other circuits such as timing sources, peripherals, voltage regulators, and power management circuits, which are well known in the art, and therefore, will not be described any further.

A bus interface 908 provides an interface between the bus 902 and a transceiver 910. The transceiver 910 provides a means for communicating with various other apparatus over a transmission medium. Depending upon the nature of the apparatus, a user interface 912 (e.g., keypad, display, speaker, microphone, joystick) may also be provided.

The processor 904 is responsible for managing the bus 902 and general processing, including the execution of software stored on the computer-readable medium 906. The software, when executed by the processor 904, causes the processing system 914 to perform the various functions described herein related to allocating user equipment processing capability among multiple access nodes for any particular apparatus. The computer-readable medium 906 may also be used for storing data that is manipulated by the processor 904 when executing software. In addition, any aspect of FIG. 9 may be implemented by hardware, software, and/or a combination thereof.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software or combination of both depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The aspects, actions, or steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other known form of storage medium. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on a computer-readable medium, or transmitted over a computer-readable medium, as one or more instructions or code. Computer-readable media includes both computer storage media and communication media including any medium that facilitates transfer of a computer program from one place to another. A storage media may be any available media that can be accessed by a general purpose or special purpose computer. A computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. A computer-readable medium may also include, by way of example, a carrier wave, a transmission line, and any other suitable medium for transmitting software and/or instructions that may be accessed and read by a computer. As such, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted, pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the aspects described herein. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but, rather, is to be accorded the widest scope consistent with the principles and novel features disclosed herein.

The invention claimed is:

1. A method of allocating processing capability of a user equipment, comprising:

determining the processing capability of the user equipment;

determining a first allocation of the processing capability of the user equipment for a first access node or a second allocation of the processing capability of the user equipment for a second access node when the user equipment is in communication with at least the first access node and the second access node, wherein a total of the first allocation and the second allocation is less than or equal to the processing capability of the user equipment; and assigning resources for the user equipment based at least in part on the first allocation or the second allocation.

2. The method of claim 1, wherein the first access node and the second access node are associated with different radio access technologies.

3. The method of claim 1, wherein the first access node and the second access node are associated with a same radio access technology.

4. The method of claim 1, wherein the processing capability of the user equipment comprises a processing resource, and further comprising partitioning the processing resource based on at least one of the first allocation or the second allocation.

5. The method of claim 1, wherein determining the first allocation of the processing capability comprises:

determining that the user equipment is in communication with the first access node and the second access node; and negotiating with the second access node to determine the first allocation for the first access node and the second allocation for the second access node such that the total of the first allocation and the second allocation is less than or equal to the processing capability of the user equipment.

6. The method of claim 5, wherein negotiating with the second access node comprises:

receiving a second allocation request from the second access node; and determining the first allocation based on the processing capability of the user equipment and the second allocation request such that the total of the first allocation and the second allocation is less than or equal to the processing capability of the user equipment.

7. The method of claim 5, wherein negotiating with the second access node comprises:

sending the first allocation to the second access node; and determining the second allocation based on the processing capability of the user equipment and the first allocation such that a total of the first allocation and the second allocation is less than or equal to the processing capability of the user equipment.

8. The method of claim 5, wherein negotiating with the second access node comprises communicating the second allocation to the second access node.

9. The method of claim 5, wherein negotiating with the second access node comprises receiving the first allocation from the second access node.

10. The method of claim 5, wherein negotiating with the second access node comprises communicating with the second access node via the user equipment when the first access node and the second access node do not have direct communication with one another.

11. The method of claim 5, wherein negotiating with the second access node to determine the first allocation for the first access node and a second allocation for the second access node comprises determining the first allocation and the second allocation based on at least one network condition.

12. The method of claim 11, wherein the at least one network condition is a quality of service (QoS) of data flow for at least one of the first access node or the second access node.

13. The method of claim 11, wherein the at least one network condition is a radio condition, wherein the radio condition comprises at least one of a received signal, signal-plus-interference-to-noise ratio (SINR), or pathloss observed by at least one of the first access node or the second access node.

14. The method of claim 11, wherein the at least one network condition is a load condition of at least one of the first access node or the second access node.

15. The method of claim 11, wherein the at least one network condition is a capability of at least one of the first access node or the second access node, wherein the capability comprises at least one of a processing capability or a throughput capability.

16. The method of claim 11, wherein the at least one network condition is a performance of a backhaul connection between the first access node and the second access node, wherein the performance of the backhaul connection comprises at least one of backhaul capacity, backhaul throughput, or backhaul delay.

17. The method of claim 11, wherein the at least one network condition is a data buffer status observed by at least one of the user equipment, the first access node, or the second access node.

18. The method of claim 5, further comprising transmitting at least one of the first allocation or the second allocation to the user equipment.

19. The method of claim 5, wherein the first allocation and the second allocation of the processing capability of the user equipment are the same for all subframes across a frame.

20. The method of claim 5, wherein the first allocation and the second allocation of the processing capability of the user equipment are different for at least some subframes across a frame.

21. The method of claim 5, wherein the first allocation and the second allocation are dynamic and can be renegotiated between the first access node and the second access node.

22. The method of claim 1, wherein determining the first allocation or the second allocation of the processing capability of the user equipment comprises:

retrieving processing capability information of the user equipment, wherein the processing capability information of the user equipment includes total processing capability of the user equipment;

determining that the user equipment is in communication with the first access node and the second access node; and determining the first allocation or the second allocation of the processing capability of the user equipment based on a previously-configured rule.

23. The method of claim 22, wherein the user equipment is associated with a category, and further comprising retrieving the previously-configured rule based on the category.

24. A non-transitory computer-readable medium storing computer-executable code, comprising:

code for causing at least one computer to determine processing capability of a user equipment;

code for causing the at least one computer to determine a first allocation of the processing capability of the user equipment for a first access node or a second allocation of the processing capability of the user equipment for a second access node when the user equipment is in communication with at least the first access node and the second access node, wherein a total of the first allocation and the second allocation is less than or equal to the processing capability of the user equipment; and code for causing the at least one computer to assign resources for the user equipment based at least in part on the first allocation or the second allocation.

25. An apparatus for allocating processing capability of a user equipment, comprising:
means for determining the processing capability of the user equipment;
means for determining a first allocation of the processing capability of the user equipment for a first access node or a second allocation of the processing capability of the user equipment for a second access node when the user equipment is in communication with at least the first access node and the second access node, wherein a total of the first allocation and the second allocation is less than or equal to the processing capability of the user equipment; and
means for assigning resources for the user equipment based at least in part on the first allocation or the second allocation.

26. An apparatus for allocating processing capability of a user equipment, comprising:
at least one memory configured to store instructions; and
at least one processor and a scheduler, coupled to the at least one memory, configured to execute the instructions to:
determine the processing capability of the user equipment;
determine a first allocation of the processing capability of the user equipment for a first access node or a second allocation of the processing capability of the user equipment for a second access node when the user equipment is in communication with at least the first access node and the second access node, wherein a total of the first allocation and the second allocation is less than or equal to the processing capability of the user equipment; and
assign resources for the user equipment based at least in part on the first allocation or the second allocation.

27. The apparatus of claim 26, wherein the at least one processor and the scheduler are further configured to execute the instructions to:
determine that the user equipment is in communication with the first access node and the second access node; and
negotiate with the second access node to determine the first allocation for the first access node and the second allocation for the second access node such that the total of the first allocation and the second allocation is less than or equal to the processing capability of the user equipment.

28. The apparatus of claim 27, wherein the at least one processor and the scheduler are further configured to execute the instructions to determine the first allocation and the second allocation based on at least one network condition.

29. The apparatus of claim 26, wherein the at least one processor and the scheduler are further configured to execute the instructions to:
retrieve processing capability information of the user equipment, wherein the processing capability information of the user equipment includes total processing capability of the user equipment;
determine that the user equipment is in communication with the first access node and the second access node; and
determine the first allocation or the second allocation of the processing capability of the user equipment based on a previously-configured rule.

30. The apparatus of claim 29, wherein the user equipment is associated with a category, and the at least one processor and the scheduler are further configured to execute the instructions to retrieve the previously-configured rule based on the category.

* * * * *